(12) United States Patent
Narita et al.

(10) Patent No.: US 6,758,597 B2
(45) Date of Patent: Jul. 6, 2004

(54) BEARING MEMBER AND METHOD FOR MANUFACTURING THE SAME AND DYNAMIC PRESSURE BEARING DEVICE

(75) Inventors: Takayuki Narita, Nagano (JP); Hiromasa Marumo, Nagano (JP); Masayuki Ishikawa, Nagano (JP)

(73) Assignee: Sankyo Seiki MFG Co., Ltd, Nagano (JP)

( * ) Notice: Subject to any disclaimer, the term of this patent is extended or adjusted under 35 U.S.C. 154(b) by 0 days.

(21) Appl. No.: 09/931,651

(22) Filed: Aug. 15, 2001

(65) Prior Publication Data

US 2002/0051587 A1 May 2, 2002

(30) Foreign Application Priority Data

Sep. 1, 2000 (JP) .................................. 2000-266077

(51) Int. Cl.[7] .............................................. F16C 32/06
(52) U.S. Cl. .................................................. 384/100
(58) Field of Search .......................................... 384/100

(56) References Cited

U.S. PATENT DOCUMENTS

| | | | | | |
|---|---|---|---|---|---|
| 4,149,969 | A | * | 4/1979 | Robitaille et al. | 252/181 |
| 4,395,294 | A | * | 7/1983 | Hobbins et al. | 428/457 |
| 5,127,744 | A | * | 7/1992 | White et al. | 384/112 |
| 5,308,521 | A | * | 5/1994 | Pavilon et al. | 508/192 |
| 5,316,573 | A | * | 5/1994 | Brusic et al. | 106/14.16 |
| 5,670,033 | A | * | 9/1997 | Burgess et al. | 205/74 |
| 5,998,898 | A | * | 12/1999 | Fukutani et al. | 384/100 |
| 6,332,989 | B1 | * | 12/2001 | Yang et al. | 252/79.1 |
| 6,432,826 | B1 | * | 8/2002 | Emami et al. | 438/692 |
| 6,436,302 | B1 | * | 8/2002 | Li et al. | 216/38 |
| 2001/0015345 | A1 | * | 8/2001 | Emami et al. | 216/89 |

* cited by examiner

*Primary Examiner*—Robert Siconolfi
(74) *Attorney, Agent, or Firm*—Hogan & Hartson, LLP

(57) ABSTRACT

A bearing member and a dynamic pressure bearing device using the bearing member includes a cylindrical body constituting a bearing member that rotatably supports a shaft member. The cylindrical body is made of a copper metal, and an anti-rust film comprising cupric benzotriazole is formed on the surface of the cylindrical body.

9 Claims, 1 Drawing Sheet

BEARING MEMBER AND METHOD FOR MANUFACTURING THE SAME AND DYNAMIC PRESSURE BEARING DEVICE

BACKGROUND OF THE INVENTION

1. Field of the Invention

The present invention relates to a bearing member including a cylindrical body rotatably supporting a shaft member and a method for manufacturing the bearing member, and to a dynamic pressure bearing device.

2. Description of Related Art

Bearing members that rotatably support a shaft member are widely used in various devices, but they are often made with copper metals such as phosphor bronze. Copper metals in general do not have good corrosion resistance and have a problem of being prone to discoloration and corrosion. In devices that require a clean environment, such as hard disk drive devices (HDD), anti-corrosion measures, e.g., plating, are rendered on the surface of the bearing member.

However, implementing anti-corrosion measures such as plating as discussed above requires a considerable amount of preparation and time, and the anti-corrosion measures are a cause behind lower productivity. Due to the fact that the plated film is a hard film, plating in particular makes subsequent processes difficult. Also, pieces and dusts of the plated film would likely adhere and/or remain in areas where the plated layer has been cut off, and the residue of hard pieces and dusts sometimes scratches or wears away the surface of a shaft member. Further, because the thickness of the plated layer can vary approximately ±20% and there are protrusions on the surface, a problem may occur in the precision of dimensions.

For example, in a dynamic pressure bearing device that utilizes the dynamic pressure of a lubricating fluid, because the dynamic pressure is generated in the lubricating fluid poured into a narrow bearing gap space, fluctuations in dimensions and protrusions can occur as described above when the plate layer is formed on the dynamic pressure surface and can have a great impact on the dynamic pressure performance.

SUMMARY OF THE INVENTION

It is an object of the present invention to provide a bearing member, its manufacturing method, and a dynamic pressure bearing device that can easily and effectively prevent discoloration and corrosion of the bearing member surface.

In order to achieve the above object, in a bearing member in accordance with one embodiment of the present invention and a dynamic pressure bearing device using the bearing member, a cylindrical body constituting a bearing member that rotatably supports a shaft member may be made of a copper metal, and an anti-rust film comprising cupric benzotriazole may be formed on the surface of the cylindrical body.

With such a bearing member, a favorable anti-rust effect can be obtained in a stable manner and a time-consuming anti-corrosion measures such as plating can be made unnecessary through the anti-rust film comprising cupric benzotriazole that can be formed easily. In addition, the anti-rust film comprising cupric benzotriazole forms extremely thinly and therefore causes virtually no fluctuations in the dimensions of the bearing member, and peeling problems can also be avoided due to the fact that the film has stable adhesion strength.

In the dynamic pressure bearing device according to the present invention, a lubricating fluid to which benzotriazole has been added may be used as a lubricating fluid inside a bearing gap space formed between the bearing member defining the cylindrical body and the shaft member. As a result, even if the anti-rust film comprising cupric benzotriazole formed on the surface of the bearing member is eliminated due to impact from heat, the benzotriazole added to the lubricating fluid would be supplied to the part of the anti-rust film that was eliminated and a new anti-rust film comprising cupric benzotriazole will be formed there.

Here, the benzotriazole added to the lubricating fluid may be between 0.01 wt. % and 10 wt. %.

Further in the dynamic pressure bearing device in accordance with the present invention, a capillary sealing section, which holds the lubricating fluid within the bearing gap space by surface tension, may be provided at the opening area of the bearing gap space.

When a capillary sealing section is provided at the opening area of the bearing gap, in the event the anti-rust film comprising cupric benzotriazole formed on the surface of the bearing member is eliminated due to impact from heat, the angle of contact of the lubricating fluid against the surface of the bearing member would become larger, causing the surface tension of the capillary sealing section to diminish, which would harm the sealing function of the lubricating fluid and increase the possibility of the lubricating fluid leaking to the outside. In contrast, in accordance with the present invention, the benzotriazole added to the lubricating fluid would be supplied anew to the part of the anti-rust film that was eliminated and form a new anti-rust film comprising cupric benzotriazole at the capillary sealing section. In other words, a new anti-rust film comprising cupric benzotriazole is automatically formed at the capillary sealing section when the anti-rust film comprising cupric benzotriazole formed on the surface of the bearing member is eliminated. The newly formed anti-rust film comprising cupric benzotriazole would cause the angle of contact of the lubricating fluid to be small again, and as a consequence the sealing function would be maintained well and the sealability of the lubricating fluid would be maintained favorably over a long period of time.

In the manufacturing method of a bearing member according to the present invention, a cylindrical body that supports a shaft member relatively rotatable with respect to the cylindrical body is formed with a copper metal and an anti-rust film comprising cupric benzotriazole may be formed on the surface of the cylindrical body. According to this manufacturing method, the anti-rust film comprising cupric benzotriazole can be easily formed and time-consuming anti-corrosion measures such as plating are rendered unnecessary.

In the manufacturing method in accordance with the present invention, the anti-rust film comprising cupric benzotriazole may be formed using a washing solution or a machining solution to which benzotriazole has been added.

In accordance with the present embodiment, the washing solution to which benzotriazole has been added may be a water-soluble washing solution used in a degreasing washing process following a finishing process of the cylindrical body. In addition, pure water to which a cleaning agent has been added may be used as the water-soluble washing solution, and the cleaning agent can have a surface-active agent as its primary component and have benzotriazole added to it. Further, the machining solution to which benzotriazole has been added may be a water-soluble cutting solution used in the cutting of the cylindrical body.

In accordance with the present invention, organic solvents used conventionally are unnecessary, and water stains and discoloration that are prone to occur in the drying process after washing with pure water can be favorably prevented by the anti-rust film comprising cupric benzotriazole formed on the surface of the bearing member.

Other features and advantages of the invention will be apparent from the following detailed description.

PREFERRED EMBODIMENT

Figure 1:
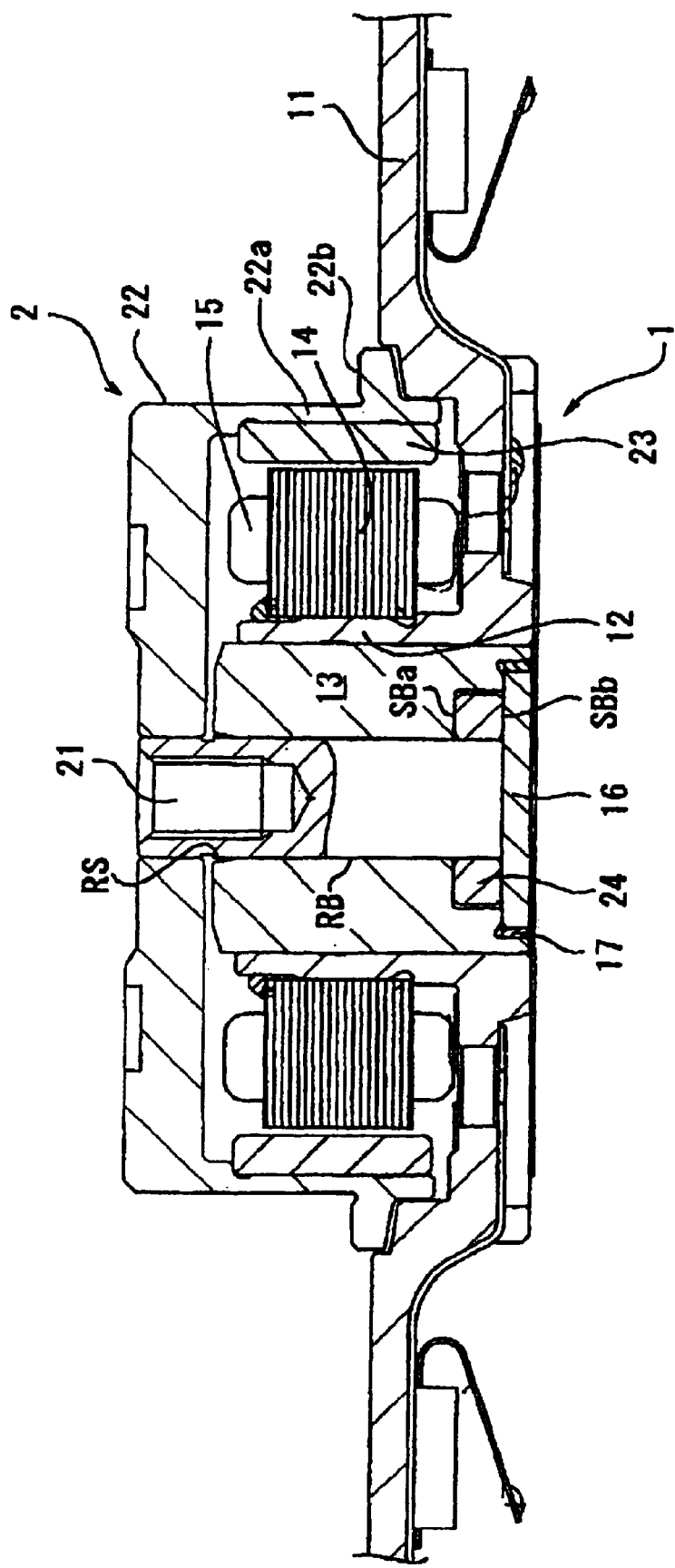
FIG. 1 shows a longitudinal cross-sectional view to explain an example of a structure of a motor for HDD (hard disk drive device) equipped with a dynamic pressure bearing device to which the present invention has been applied.

The present invention is described below as an example of an embodiment of the present invention as applied to a bearing member of a hard disk drive device (HDD). First the overall structure of the hard disk drive device (HDD) is described with reference to FIG. 1

The shaft-rotating spindle motor for HDD shown in FIG. 1 includes a stator assembly 1, which is a fixed member, and a rotator assembly 2, which is a rotating member assembled over the stator assembly 1 as shown in the figure. Of these, the stator assembly 1 has a fixed frame 11 screwed onto a fixed base (not shown in the figure). The fixed frame 11 is formed by an aluminum metal material to reduce its weight; in the generally center area of the fixed frame 11 is a bearing holder 12 formed upright and having a ring-shaped cylindrical body section that makes up a bearing holding member.

On the inner circumference side of the bearing holder 12 is a bearing sleeve 13, which is a fixed bearing member formed in a hollow cylinder shape, fixed with an adhesive. The bearing sleeve 13 may also be joined to the bearing holder 12 through press fit or shrink fit. The bearing sleeve 13 is formed from a copper alloy material, such as phosphor bronze, in order to make the machining of holes with small diameter easy. Moreover, a film including cupric benzotriazole to be discussed later is formed on at least a part of the surface of the bearing sleeve 13 that faces a rotating shaft 21. In one embodiment, the film is composed of cupric benzotriazole functions as an anti-rust film and may be formed on the entire surface of the bearing sleeve 13.

A stator core 14 comprising a stacked layered body of electromagnetic steel plates is mounted on the mounting surface on the wall of the outer circumference of the bearing holder 12. A drive coil 15 is wound on each of the salient pole sections provided on the stator core 14.

The rotating shaft 21 that makes up the rotor assembly 2 is inserted in a freely rotatable manner in the bearing hole formed in the form of a through-hole along the center axis of the bearing sleeve 13. The rotating shaft 21 in the present embodiment is formed from stainless steel.

A dynamic pressure surface formed on the inner circumference surface of the bearing hole of the bearing sleeve 13 is positioned to face in the radial direction the dynamic pressure surface formed on the outer circumference surface of the rotating shaft 21; and in a minute bearing gap space between the two dynamic pressure surfaces is formed a radial dynamic pressure bearing section RB. More specifically, the dynamic pressure surface on the bearing sleeve 13 side and the dynamic pressure surface on the rotating shaft 21 side in the radial dynamic pressure bearing section RB face each other in a circular fashion across a minute gap of a few $\mu$m. This minute gap space forms a bearing gap space into which a predetermined lubricating fluid comprising a lubricating oil or an electromagnetic fluid is poured. Benzotriazole is added to the lubricating fluid, as discussed later.

The dynamic pressure surface of the bearing sleeve 13 are provided with radial dynamic pressure generating grooves (not shown in the figure) formed in a herringbone configuration in two blocks of concave ring shapes separated in the axial direction, for example. According to the structure having the radial dynamic pressure generating grooves, when rotation takes place, the pumping action of the two blocks of radial dynamic pressure generating grooves pressurizes the lubricating fluid to generate dynamic pressure, so that the rotating shaft 21 and a rotating hub 22 discussed later are supported in the radial direction while floating in the shaft direction by the dynamic pressure of the lubricating fluid.

Furthermore, a known capillary sealing section RS is provided at an opening area, indicated at the top of the figure, in the bearing gap space of the radial dynamic pressure bearing section RB. The capillary sealing section RS is structured by the bearing gap space facing in the radial direction with a tilt surface formed on the bearing sleeve 13 or on the rotating shaft 21 in a manner that the tilt surface gradually widens towards the outside of the bearing (towards the top of the figure), such that the gap in the radial direction gradually widens to a gap dimension of 20 $\mu$m to 300 $\mu$m, for example. The fluid volume and the size of the capillary sealing section RS are determined in such a way that the gas-liquid interface of the lubricating fluid is found in the capillary sealing section RS in both the motor rotation and stop states.

In the meantime, at the end of the rotating shaft 21, indicated at the bottom of the figure, is fixed a ring disk-shaped thrust plate 24. The thrust plate 24 is contained in a cylinder-shaped depression formed in a concave fashion at the bottom center of the bearing sleeve 13 in the figure. In the depression of the bearing sleeve 13, the dynamic pressure surface provided on the top surface of the thrust plate 24 faces in close proximity the dynamic pressure surface provided on the bearing sleeve 13. In a bearing gap space between the dynamic pressure surfaces of the thrust plate 24 and the bearing sleeve 13 is formed a top thrust dynamic pressure bearing section SBa.

Additionally, in close proximity to the bottom dynamic pressure surface of the thrust plate 24 is a counter plate 16, which consists of a disk-shaped member with a relatively large diameter. The counter plate 16 is mounted to close off the bottom opening area of the bearing sleeve 13 and fixed with an adhesive 17. A bottom thrust dynamic pressure bearing section SBb is formed in a gap formed by the dynamic pressure surface provided at the top of the counter plate 16 and the dynamic pressure surface provided at the bottom of the thrust plate 24 facing each other in close proximity.

The two dynamic pressure surfaces of the thrust plate 24 and the dynamic pressure surface of the bearing sleeve 13 and of the counter plate 16 that faces them together constitute a set of thrust dynamic pressure bearing sections SBa and SBb next to each other in the axial direction. These thrust dynamic pressure bearing sections are in each case arranged so that the opposing dynamic pressure surfaces face each other across a minute gap of a few $\mu$m in the axial direction. The identical lubricating fluid is filled from the radial dynamic pressure bearing section RB constantly into the bearing gap spaces formed by the minute gaps and continues in the axial direction via a path on the outer circumference of the thrust plate 24. Furthermore, on at least one of the dynamic pressure surface of the thrust plate 24 and that of the bearing sleeve 13, and on at least one of the dynamic pressure surface of the thrust plate 24 and that of the counter plate 16, are provided herringbone-shaped thrust dynamic pressure generating grooves (not shown in the figure) in two blocks of concave ring shapes separated in the radial direction, for example. By this structure, when rotation takes place, the pumping action of the thrust dynamic pressure generating grooves pressurizes the lubricating fluid to generate dynamic pressure, so that the rotating shaft 21 and the rotating hub 22 are shaft-supported in the thrust direction by the dynamic pressure of the lubricating fluid.

The rotating hub 22 that along with the rotating shaft 21 constitutes the rotor assembly 2 is formed from a generally cup-shaped member formed by an aluminum metal or an iron metal alloy, so that a memory medium such as a magnetic disk (not shown in the figure) can be mounted thereon. The center area of the rotating hub 22 is provided with a joint hole, which is joined in a unitary fashion through press fit or shrink fit with the top area of the rotating shaft 21 in the figure. The rotating hub 22 has a generally cylinder-shaped body section 22a on whose outer circumference a recording medium disk is mounted. A disk mounting surface 22b on which a recording medium disk (not shown in the figure) is mounted projects outwardly from the body section 22a in the radial direction.

A ring-shaped drive magnet 23 is mounted on the inner circumference wall of the body section 22a. The ring-shaped drive magnet 23 is circularly positioned opposite in close proximity to the outer circumference end surfaces of the salient pole sections of the stator core 14.

As discussed above, an anti-rust film comprising cupric benzotriazole is formed on all surfaces of the entire bearing sleeve 13, which is the fixed bearing member, and benzotriazole is added to the lubricating fluid. These features are discussed in detail below.

First, benzotriazole (BTA) is a heterocyclic compound expressed as $C_6H_4N_2.NH$ and has the following structure:
Structural formula:

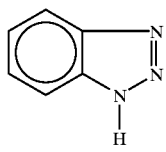

Benzotriazole (BTA) may preferably be added to the lubricating fluid at the ratio of 0.01 wt. % or more. In the present embodiment, benzotriazole (BTA) is added at the ratio of 0.5 wt. %. More than 10 wt. % of benzotriazole (BTA) may not yield any greater effect and therefore may be unnecessary. Addition of 10 wt. % or less is sufficient and no substantial problems would arise by adding 5 wt. % or less.

In the meantime, the anti-rust film comprising cupric benzotriazole formed on all surfaces of the entire bearing sleeve 13 is a polymer complex film expressed as $(C_6H_4N_3)_2.Cu$, and has the following structure obtained by having the "copper" in the phosphor bronze that make up the bearing sleeve 13 react with benzotriazole (BTA):

Structural formula:

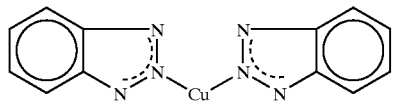

The process to form the anti-rust film comprising cupric benzotriazole can be performed at the same time as the washing process following the cutting in the finishing process, i.e., the degreasing washing process that takes place after cutting a blank material for the bearing sleeve 13 from a phosphor bronze rod material and finishing the inner diameter. Specifically, in the degreasing washing process following the cutting, a water-soluble washing solution is used. The water-soluble washing solution used is pure water mixed with a cleaning agent, whose main component is a surface-active agent and to which benzotriazole has been added. Pure water is used as a solvent due to the fact that benzotriazole does not react with water and therefore a stable condition can be maintained.

The cleaning agent (surface-active agent) constituting the washing solution in accordance with the embodiment is mixed with pure water at the ratio of 5 wt. % to pure water, while benzotriazole is added at the ratio of 0.01 wt. % or more, for example, only 0.5 wt. %, to pure water.

The degreasing washing process in which the washing solution is used is performed using a six-tank method pure water washer. In the six-tank method, ultrasonic degreasing washing with the washing solution is conducted in the first tank, and ultrasonic washing with pure water is conducted in the second tank. Between the third tank and the fifth tank, a washing process using only pure water is repeated several times, and warm air-drying takes place in the final process.

In the ultrasonic degreasing washing in the first tank, the washing action of the washing solution removes processing oil adhered to the surface of the blank material for the bearing sleeve 13, while at the same time benzotriazole adheres to the surface of the blank material, i.e., the exposed copper areas, of the bearing sleeve 13 cleansed by the process. By having benzotriazole react with copper and adhere to it, an anti-rust film comprising cupric benzotriazole $((C_6H_4N_3)_2.Cu)$ is formed on the areas where the adhesion takes place. The anti-rust film comprising cupric benzotriazole $((C_6H_4N_3)_2.Cu)$ consists of a nearly monomolecular and uniform thin film (film thickness approximately $10^{-10}$ mm), and works to prevent external moisture and oxygen from being supplied to the blank material. Consequently, it prevents discoloration and water stains from occurring on the bearing sleeve 13, while also providing a favorable corrosion resistance, i.e., an anti-rust effect.

Due to the fact that the anti-rust film comprising cupric benzotriazole $((C_6H_4N_3)_2.Cu)$ formed in the first tank is insoluble in water, it does not peel off in the pure water rinsing processes that take place in the second tank through the fifth tank, and is removed from the washer still intact. As a result, discoloration and water stains are prevented from occurring throughout the entire process from washing to drying, and an anti-rust effect is obtained after drying.

As described above, the bearing sleeve 13 according to the present embodiment would have a favorable anti-rust effect through the anti-rust film comprising cupric benzotriazole easily formed in the washing process, which renders unnecessary such conventional time-consuming anti-rust measures as plating. Furthermore, the anti-rust film comprising cupric benzotriazole causes virtually no fluctuations in the dimensions of the bearing sleeve 13 due to the fact that the film is formed extremely thinly, and impact from peeling can be avoided due to the film's stable adhesion strength.

For example, the following table shows the results of performing corrosion tests on the bearing sleeve 13 made of phosphor bronze with various surface treatments listed in the second column from the left, and states of discoloration and corrosion observed at various times indicated in the top row:

TABLE

Test condition: 60° C., 90%

| No. | Surface Treatment | 24 hr. | 48 hr. | 100 hr. | 150 hr. | 200 hr. | Verdict |
|---|---|---|---|---|---|---|---|
| 1 | none | corrosion occurred | | | | | NG |
| 2 | benzotriazole | OK | OK | OK | OK | slight discoloration occurred | OK |
| 3 | Ni—P plating (5 μm) | OK | OK | OK | OK | OK | OK |
| 4 | Ni—P plating (3 μm) | OK | corrosion occurred | | | | NG |

Here, the target time for no occurrence of discoloration or corrosion is 100 hours, and as the table shows, using benzotriazole as in the present invention yields discoloration and corrosion resistance performance equivalent to that of nickel plating.

Particularly in a dynamic pressure bearing device according to the present embodiment, due to the fact that the lubricating fluid poured into narrow bearing gap spaces is caused to generate dynamic pressure, the anti-rust film comprising cupric benzotriazole would provide a favorable dynamic pressure performance over a long period of time and would also eliminate unnecessary dust that was present with conventional plating, which would make it possible to meet the cleanliness requirement for hard disk drive devices (HDD).

Furthermore, in the present embodiment, because benzotriazole is added to the lubricating fluid, even if the anti-rust film comprising cupric benzotriazole formed on the surface of the bearing sleeve 13 were to be eliminated due to impact from heat, the benzotriazole added to the lubricating fluid would be supplied anew to the part of the anti-rust film that was eliminated and form a new anti-rust film comprising cupric benzotriazole on the exposed area.

Particularly with the capillary sealing section RS provided at the end of the bearing sleeve 13, if the anti-rust film comprising cupric benzotriazole formed on the surface of the bearing sleeve 13 that forms the capillary sealing section RS is eliminated due to impact from heat, the angle of contact of the lubricating fluid against the surface of the bearing sleeve 13 would become larger, causing the surface tension to diminish by that much, which would harm the sealing function of the lubricating fluid and increase the possibility of the lubricating fluid leaking to the outside. However, in the present embodiment, the benzotriazole added to the lubricating fluid would be supplied anew to the part of the anti-rust film that was eliminated and form a new anti-rust film comprising cupric benzotriazole there; the newly formed anti-rust film comprising cupric benzotriazole will cause the angle of contact of the lubricating fluid to be small began, and as a consequence it would be possible to maintain the sealability of the lubricating fluid at the capillary sealing section RS favorably over a long period of time.

Such an anti-rust film comprising cupric benzotriazole can be easily and reliably formed through a washing process using a washing solution to which benzotriazole has been added, as in the present embodiment, and the washing process is environmentally desirable since there is no need to use organic solvents that were needed in the past. In addition, water stains and discoloration that are especially prone to occur in the drying process after washing with pure water are favorably prevented through the anti-rust film comprising cupric benzotriazole formed on the surface of the bearing sleeve 13.

In the present mode of embodiment, when cutting the blank material for the bearing sleeve 13 using a water-soluble cutting solution, benzotriazole can be added to the water-soluble cutting solution in order to form an anti-rust film comprising cupric benzotriazole on the blank material for the bearing sleeve 13 in the cutting process. And even when using a normal cutting oil that is not water-soluble, benzotriazole can be dissolved into the cutting oil by using alcohol. An example of cutting oil with such a makeup is a product called B-1584 (by Chiyoda Chemical).

In the meantime, the thrust plate 24 constituting the thrust bearing SB is often formed with phosphor bronze, and a similar anti-rust film comprising cupric benzotriazole can be formed on the surface of the thrust plate 24 with actions and effects similar to those described above.

An anti-rust film comprising cupric benzotriazole can be formed on the thrust plate 24 also in the final washing process, similarly to the embodiment discussed above. However, in the case of the blank material for the thrust plate 24, a barrel process is executed to remove burrs and round edges after washing the blank material formed by press machining or cutting. Therefore, by using in the barrel process a machining solution in which benzotriazole has been added to pure water, it is also possible to form an anti-rust film comprising cupric benzotriazole on the surface of the thrust plate 24.

The mode of embodiment of the present invention by the inventor has been described in detail thus far, but the present invention is not limited to the embodiment described above and many modifications can be made without departing from the present invention.

For example, the present invention can be similarly applied to bearing members used on various dynamic pressure bearing motors other than the hard disk drive (HDD) motor, including, for instance, dynamic pressure bearing devices used in motors for polygon mirror rotation, and on other types of devices.

As described above, a bearing member or its manufacturing method according to the present invention provides a simple and favorable anti-rust effect by forming on the bearing member an anti-rust film comprising cupric benzotriazole that can be easily formed. By rendering such unnecessary conventional time-consuming countermeasures as plating and forming a thin anti-rust film comprising cupric benzotriazole, fluctuations in the dimensions of the bearing member are virtually eliminated, and the film's stable adhesion strength allows it to avoid impact from peeling. Consequently, the bearing member or its manufacturing method according to the present invention provides an easy and effective prevention of discoloration and corrosion of the bearing member, which allows the bearing member's reliability to be maintained while significantly improving its productivity.

A dynamic pressure bearing device according to the present invention offers a favorable dynamic pressure performance over a long period of time and reduces unnecessary dust by employing the anti-rust film on the sleeve of the dynamic pressure bearing device. As a result, the dynamic pressure bearing device according to the present invention can improve at low cost the dynamic pressure performance of the dynamic pressure bearing device that causes a lubricating fluid injected in narrow bearing gap spaces to generate dynamic pressure.

Furthermore, with the dynamic pressure bearing device according to the present invention, by injecting a lubricating fluid to which benzotriazole has been added in bearing gaps formed between a bearing member and a shaft member, even if the anti-rust film comprising cupric benzotriazole formed on the surface of the bearing member is eliminated due to impact from heat, a new anti-rust film comprising cupric benzotriazole can be formed with the benzotriazole added to the lubricating fluid, and the effects described above can be maintained in a stable manner over a long period of time.

Moreover, with the dynamic pressure bearing device according to the present invention, when a capillary sealing section is provided at the opening of the bearing gap, even if the anti-rust film comprising cupric benzotriazole formed on the surface of the bearing member side is eliminated due to impact from heat, the benzotriazole added to the lubricating fluid would form a new anti-rust film comprising cupric benzotriazole, and as a consequence a favorable sealability of the lubricating fluid would be maintained over a long period of time.

In addition, with the method for manufacturing the bearing member according to the present invention, by using as a water-soluble washing solution a mixture of pure water and a cleaning agent whose main component is a surface-active agent and to which benzotriazole has been added, the conventional use of organic solvents can be eliminated and water stains and discoloration prone to occur in the drying process after washing with pure water can be favorably prevented as well.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A dynamic pressure bearing device, comprising:
   a cylindrical member for rotatably supporting a shaft member, wherein the cylindrical member is composed of a copper metal; and
   a lubricating fluid including benzotriazole, the lubricating fluid filling a bearing gap space formed between the cylindrical member and the shaft member and the lubricating fluid is in contact with at least the cylindrical member, wherein an anti-rust film of cupric benzotriazole is formed on a surface of the cylindrical member by reacting the copper metal of the cylindrical member with the benzotriazole in the lubricating fluid, and, as the anti-rust film is eliminated through operation of the bearing member, a new anti-rust film of cupric benzotriazole is formed through another reaction between the copper metal of the cylindrical member and the benzotriazole in the lubricating fluid.

2. A bearing member according to claim 1, wherein the film composed of cupric benzotriazole is formed on all surfaces of the cylindrical member.

3. A bearing member according to claim 1, wherein the the film composed of cupric benzotriazole is an anti-rust film that substantially prevents water and oxygen from entering the copper metal that forms the cylindrical member.

4. A bearing member according to claim 1, wherein the anti-rust film has a thickness of about $10^{-10}$ mm.

5. A dynamic pressure bearing device comprising:
   a bearing member including a shaft member;
   a cylindrical member that rotatably supports the shaft member, wherein the cylindrical member is made from a copper metal; and
   a lubricating fluid including benzotriazole, filled in a bearing gap space formed between the cylindrical member and the shaft member and at least in contact with the cylindrical member, the cylindrical member including a dynamic pressure bearing sleeve that relatively rotatably supports the shaft member through dynamic pressure of a the lubricating fluid; wherein an anti-rust film of cupric benzotriazole is formed by reacting the copper metal of the cylindrical member with the benzotriazole in the lubricating fluid, and, as the anti-rust film is eliminated through operation of the bearing member, a new anti-rust film of cupric benzotriazole is formed through another reaction between the copper metal of the cylindrical member and the benzotriazole in the lubricating fluid.

6. A dynamic pressure bearing device according to claim 5, wherein the lubricating fluid includes benzotriazole at a ratio of between 0.01 wt. % and 10 wt. %.

7. A dynamic pressure bearing device according to claim 5, further comprising a capillary sealing section provided at an opening area of the bearing gap space for holding the lubricating fluid within the bearing gap space by surface tension.

8. A dynamic pressure bearing device according to claim 7, wherein a new film composed of cupric benzotriazole is automatically formed at the capillary sealing section when the film composed of cupric benzotriazole is eliminated at the capillary sealing section.

9. A dynamic pressure bearing device according to claim 7, wherein the lubricating fluid including cupric benzotriazole forms a new film composed of cupric benzotriazole at the capillary sealing section when the film composed of cupric benzotriazole is eliminated at the capillary sealing section.

* * * * *